US009638129B2

(12) United States Patent
Nishio et al.

(10) Patent No.: US 9,638,129 B2
(45) Date of Patent: May 2, 2017

(54) CONTROLLER AND CONTROL METHOD FOR GAS ENGINE

(71) Applicant: MITSUBISHI HEAVY INDUSTRIES, LTD., Tokyo (JP)

(72) Inventors: Hideki Nishio, Tokyo (JP); Junnosuke Andou, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 137 days.

(21) Appl. No.: 14/377,532

(22) PCT Filed: Feb. 15, 2013

(86) PCT No.: PCT/JP2013/053669
§ 371 (c)(1),
(2) Date: Aug. 8, 2014

(87) PCT Pub. No.: WO2013/125460
PCT Pub. Date: Aug. 29, 2013

(65) Prior Publication Data
US 2015/0000635 A1    Jan. 1, 2015

(30) Foreign Application Priority Data

Feb. 23, 2012 (JP) ................................. 2012-038010

(51) Int. Cl.
*F02D 41/30* (2006.01)
*F02D 35/02* (2006.01)
(Continued)

(52) U.S. Cl.
CPC ...... *F02D 41/3011* (2013.01); *F02B 19/1023* (2013.01); *F02D 19/023* (2013.01);
(Continued)

(58) Field of Classification Search
CPC .. F02D 41/3011; F02D 19/023; F02D 19/025; F02D 35/023; F02D 35/02;
(Continued)

(56) References Cited

U.S. PATENT DOCUMENTS 4,932,379 A * 6/1990 Tang .................. F02D 41/1498
123/436
4,971,010 A * 11/1990 Iwata .................. F02D 41/0087
123/481
(Continued)

FOREIGN PATENT DOCUMENTS

CN         1849445 A     10/2006
CN       102333944 A      1/2012
(Continued)

OTHER PUBLICATIONS

International Preliminary Report on Patentability and Written Opinion of the International Searching Authority (Forms PCT/IB/338, PCT/IB/373, PCT/ISA/237, and PCT/IB/326) for International Application No. PCT/JP2013/053669, dated Sep. 4, 2014, with an English translation.
(Continued)

*Primary Examiner* — Joseph Dallo
(74) *Attorney, Agent, or Firm* — Birch, Stewart, Kolash & Birch, LLP

(57) ABSTRACT

A controller for a gas engine includes a cycle detection unit 67 configured to detect a crank angle period of a single combustion cycle of an engine including a plurality of cylinders based on a crank angle detection value inputted from a crank angle detector 75, a misfire detection unit 69 configured to detect a misfire in a combustion chamber 37 based on an in-cylinder pressure detection value inputted from the in-cylinder pressure detector 59, and a simultaneous misfire determination unit 73 configured to determine a simultaneous misfire of more than one cylinder when a total
(Continued)

number of cylinders where the misfire is detected in the single combustion cycle by the misfire detection unit 69 is not less than a preset threshold value of a cylinder number. The fuel gas to all of the cylinders is shut off when the simultaneous misfire of more than one cylinder in the single combustion cycle is determined by the simultaneous misfire determination unit 73.

5 Claims, 6 Drawing Sheets

(51) Int. Cl.
| | | |
|---|---|---|
| *F02B 19/10* | (2006.01) | |
| *F02M 21/02* | (2006.01) | |
| *F02D 19/02* | (2006.01) | |
| *F02B 29/04* | (2006.01) | |
| *F02D 41/00* | (2006.01) | |
| *F02B 19/12* | (2006.01) | |

(52) U.S. Cl.
CPC ........... *F02D 19/025* (2013.01); *F02D 35/02* (2013.01); *F02D 35/023* (2013.01); *F02D 41/0027* (2013.01); *F02M 21/0284* (2013.01); *F02B 19/12* (2013.01); *F02B 29/0443* (2013.01); *F02D 41/009* (2013.01); *F02D 2200/1015* (2013.01); *Y02T 10/125* (2013.01); *Y02T 10/32* (2013.01)

(58) Field of Classification Search
CPC ............... F02D 41/0027; F02D 41/009; F02D 2200/1015; F02M 21/0284; F02B 19/1023; F02B 19/12; F02B 29/0443; Y02T 10/32; Y02T 10/125
USPC ......... 123/332, 333, 406.14, 406.27, 406.53, 123/406.55, 406.7; 701/102–105, 701/111–115; 73/114.02, 114.03
See application file for complete search history.

(56) References Cited

U.S. PATENT DOCUMENTS

| | | | | |
|---|---|---|---|---|
| 5,041,980 | A * | 8/1991 | Maddock | G01M 15/11 701/101 |
| 5,044,195 | A * | 9/1991 | James | G01M 15/11 73/114.05 |
| 5,222,392 | A * | 6/1993 | Baba | F02D 41/22 73/114.03 |
| 5,305,635 | A * | 4/1994 | James | G01M 15/11 73/114.02 |
| 5,387,253 | A | 2/1995 | Remboski, Jr. et al. | |
| 5,390,537 | A * | 2/1995 | Kuroda | G01M 15/11 73/114.04 |
| 5,415,028 | A * | 5/1995 | Nishimura | G01M 15/11 73/114.04 |
| 5,425,269 | A * | 6/1995 | Bradshaw | G01M 15/11 73/114.04 |
| 5,440,921 | A * | 8/1995 | Matsuno | G01M 15/11 701/111 |
| 5,471,870 | A * | 12/1995 | Kuroda | G01M 15/11 701/111 |
| 5,487,008 | A * | 1/1996 | Ribbens | F02D 41/1498 701/102 |
| 5,499,537 | A * | 3/1996 | Nakayama | G01M 15/11 701/111 |
| 5,561,600 | A * | 10/1996 | McCombie | G01M 15/11 123/436 |
| 5,639,960 | A * | 6/1997 | Nakagawa | G01M 15/11 701/110 |
| 5,687,692 | A * | 11/1997 | Togai | F02D 41/1498 123/436 |
| 5,819,197 | A * | 10/1998 | Fiaschetti | G01M 15/11 123/436 |
| 5,841,025 | A * | 11/1998 | Remboski | G01M 15/11 73/114.05 |
| 6,208,930 | B1 * | 3/2001 | Uematsu | F02D 41/263 701/110 |
| 6,763,807 | B1 | 7/2004 | Gilles et al. | |
| 7,503,207 | B2 * | 3/2009 | Nishigaki | G01M 15/11 73/114.02 |
| 7,937,992 | B2 * | 5/2011 | Akimoto | B60K 6/365 73/114.03 |
| 2008/0255749 | A1 * | 10/2008 | Murakami | F02D 17/02 701/103 |
| 2009/0088956 | A1 * | 4/2009 | Lin | B60Q 9/00 701/111 |
| 2009/0271099 | A1 * | 10/2009 | Jones | F02D 41/0225 701/115 |
| 2010/0114460 | A1 * | 5/2010 | Akimoto | B60K 6/26 701/111 |
| 2010/0286891 | A1 * | 11/2010 | Huang | F02D 35/027 701/102 |
| 2010/0294027 | A1 * | 11/2010 | Kondo | F02D 41/1498 73/114.02 |

FOREIGN PATENT DOCUMENTS

| | | |
|---|---|---|
| JP | 2001-12292 A | 1/2001 |
| JP | 2001-12293 A | 1/2001 |
| JP | 2005-127258 A | 5/2005 |
| JP | 2007-170405 A | 7/2007 |
| JP | 2009-191664 A | 8/2009 |
| JP | 2009-203883 A | 9/2009 |

OTHER PUBLICATIONS

International Search Report and Written Opinion of the International Searching Authority (Forms PCT/ISA/210, PCT/ISA/220, and PCT/ISA/237) for International Application No. PCT/JP2013/053669, dated Mar. 19, 2013.
Japanese Decision to Grant for Japanese Application No. 2012-038010, dated Jan. 30, 2015, with an English translation.
Office Action effective Jan. 6, 2016 issued in the corresponding Chinese Application No. 201380008623.7 with an English Translation.
Extended European Search Report effective Mar. 29, 2016 issued in corresponding EP Application No. 13751477.4.
Notice of Allowance effective Oct. 10, 2016 issued to the corresponding CN Application No. 201380008623.7 with an English Translation.

* cited by examiner

TIME $T_0$ REQUIRED AFTER MISFIRE OCCURRENCE BEFORE GAS STOP

INSTANT GAS STOP IN TIME $T_1$ AFTER MISFIRE OCCURRENCE

CONTROLLER AND CONTROL METHOD FOR GAS ENGINE

TECHNICAL FIELD

This invention relates to a controller and a control method for a gas engine where an air supplied through an air supply path and a fuel gas supplied from a fuel supply path are mixed and supplied into a combustion chamber to be ignited and combusted, for preventing non-combusted gas from flowing into an air exhaust system to be combusted in a flue.

BACKGROUND

In a general medium-speed gas engine, an air supplied through an air supply path (supply air) and a fuel gas supplied from a fuel supply path are mixed and then supplied to a main combustion chamber of an engine so that combustion operation is performed to obtain driving force. There has been also known a precombustion-chamber pilot-ignition type gas engine, in which a precombustion chamber that communicates with the main combustion chamber is disposed on a cylinder head. A liquid fuel such as the gas oil is injected into the air flow formed inside the precombustion chamber from a fuel injection valve to be ignited and combusted. The ignition flame thereof is injected from an injection opening of the precombustion chamber into a mixed air of the air and fuel gas introduced into the main combustion chamber by opening an air supply valve, and thereby the mixed air is combusted.

Further, a spark-ignition type gas engine has been also known, in which a fuel gas for ignition is supplied to a precombustion chamber provided for the cylinder head to produce a mixed air of high ignition performance. The mixed air is ignited and combusted by a spark plug. The ignition flame is injected into a mixed gas of the air and the fuel gas introduced into the main combustion chamber by opening an air supply valve, and thereby the mixed gas is combusted.

In the above gas engines, the flow rates of the fuel and air supplied to the combustion chamber are appropriately controlled so that a required engine output is achieved. Also, the air-to-fuel ratio is controlled so as to enable stable operation while avoiding knocking or misfire. However, abnormal combustion (knocking) or misfire is likely to occur when there is a trouble such as abrasion and malfunction of a component in the fuel supplying system or the ignition system.

For instance, a misfire occurs in all cylinders or in a particular cylinder when a required fuel gas is not supplied due to malfunction of a fuel flow rate control valve that supplies the fuel gas to the air supply path from the fuel supply path, or when there is a trouble of the ignition device such as malfunction of a spark plug or a control valve that supplies a liquid fuel such as the gas oil to the precombustion chamber.

As an example of the technique for detecting a misfire of a gas engine to forcibly stop the engine is proposed in JP2001-12292 (Patent Document 1) and JP2007-170405 (Patent Document 2).

Patent Document 1 discloses, in the abstract and paragraphs 0063 to 0067 etc, detecting an exhaust pressure waveform of an engine including a plurality of cylinders while distinguishing each cylinder, and calculating the area of the exhaust pressure waveform in a predetermined crank angle range for each cylinder. The calculated result is compared to a moving average value of the last predetermined cycle. The ratio to the average value of the waveform area is compared to a reference value to determine a misfire. When a misfire is determined, the engine is forced to stop.

Further, Patent Document 2 discloses, in paragraphs 0031 and 0032 etc, calculating a pressure difference $\Delta P$ ($\Delta P = P - P_b$) from the reference pressure $P_b$ before starting compression including the air intake pressure in accordance with a crank angle based on an in-cylinder pressure detection value inputted from an in-cylinder pressure detector and a crank angle detection value inputted from the crank angle detector, and determining occurrence of a misfire in the combustion chamber when the maximum in-cylinder pressure ratio ($\Delta Pp/\Delta P_0$), which is a ratio of the pressure difference $\Delta Pp$ between the maximum in-cylinder pressure $Pp$ and the reference pressure, to the pressure difference $\Delta P_0$ of one or more arbitrary points in the compression stroke, becomes not greater than the set minimum misfire-tolerance pressure ratio Pn. It also discloses shutting off the fuel injection of the cylinder where a misfire has occurred upon the number of cycles reaching the tolerance thr continuation of cycles.

CITATION LIST

Patent Literature

Patent Document 1: JP2001-12292
Patent Document 2: JP2007-170405

SUMMARY

Technical Problem

In a gas engine, as described above, a misfire occurs in all cylinders or in a particular cylinder when a required amount of fuel gas is not supplied due to malfunction of the fuel flow rate control valve that supplies the fuel gas to the air supply path from the fuel supply path, or when there is a trouble of the ignition device such as malfunction of a spark plug or a control valve that supplies a liquid fuel such as the gas oil to a precombustion chamber.

Particularly in the case of a trouble of the ignition device such as malfunction of a spark plug or a control valve that supplies a liquid fuel such as the gas oil to a precombustion chamber, the mixed gas of the fuel gas and air introduced into the main combustion chamber by opening the air supply valve remains not combusted and flows into the exhaust system as a non-combusted gas. Thus, when more than one cylinder has simultaneously misfired, the fuel gas density in the exhaust path rises in a short period of time and is likely to reach the combustible range, increasing the risk, of combustion inside the exhaust path. If combustion occurs inside the exhaust path, there is a possibility of damage to the engine and the plant installation as well as considerable harm to the surroundings.

The misfire determination disclosed in Patent Document 1 is based on the area of the exhaust pressure waveform, but the misfire determination is for one particular cylinder, and there is no disclosure of determining more than one cylinder being in the simultaneous misfire state. Further, as the moving average value of the last predetermined cycle is used in the comparison, the data of the last predetermined cycle is needed. Thus, a certain period of time is required to lapse for the more than one cylinder before the determination result is outputted, thereby taking time before the engine can be stopped. Therefore, this misfire determination is not suitable in a case in which it is necessary to determine a misfire in a short period of time to stop the engine, such as the case in which more than one cylinder has simultaneously misfired.

Further, the misfire determination in Patent Document 2 is using the maximum in-cylinder pressure ratio ($\Delta Pp/\Delta P_0$) of the in-cylinder pressure. However, the misfire determination is for one particular cylinder similarly to Patent Document 1, and thus there is no disclosure of determining more than one cylinder being in the simultaneous misfire state. Also, when misfires are repeated over several cycles in order to prevent a determination error, it takes time to stop the engine because the fuel injection is shut off for the misfiring cylinders. Therefore, this misfire determination is not suitable in a case in which it is necessary to determine a misfire in a short period of time to perform an emergency stop, such as the case in which more than one cylinder has simultaneously misfired.

This invention was made in view of the above problems. An object of the invention is to, in a gas engine, accurately determine a simultaneous misfire of more than one cylinder occurring in a single cycle, stop supply of a fuel gas, minimize inflow of the non-combusted fuel gas into the exhaust system, and thereby prevent combustion inside the exhaust path.

Solution to Problem

In order to achieve the above object, in the invention related to the controller for a gas engine, a controller is for a gas engine configured to mix a fuel gas and an air to be combusted in the combustion chamber of an engine. The controller comprises:
a cycle detection unit configured to detect a crank angle period of a single combustion cycle of the engine including an in-cylinder pressure detector configured to detect an in-cylinder pressure inside the combustion chamber of an engine, a crank angle detector configured to detect a crank angle of the engine, and a plurality of cylinders based on a crank angle detection value inputted from the crank angle detector;
a misfire detection unit configured to detect a misfire in the combustion chamber based on an in-cylinder pressure detection value inputted from the in-cylinder pressure detector;
a simultaneous misfire determination unit configured to determine a simultaneous misfire of more than one cylinder when a total number of cylinders where the misfire is detected in the single combustion cycle by the misfire detection unit is not less than a preset threshold value of a cylinder number; and
a fuel gas shut-off unit configured to shut off a supply of a fuel gas to all of the cylinders when the simultaneous misfire of more than one cylinder in the single combustion cycle is determined by the simultaneous misfire determination unit.

According to the present invention, by determining occurrence of a simultaneous misfire of more than one cylinder when a misfire is detected in more cylinders than the threshold value of cylinder number in the crank angle period corresponding to a single combustion cycle of the gas engine including a plurality of cylinders, it is possible to accurately determine simultaneous misfire and to perform an emergency stop, in which the fuel gas supply to all the cylinders is stopped.

As a result, it is possible to prevent the fuel gas density from rising in the exhaust path in a short period of time to reach the combustible range due to the intensive inflow of the non-combusted gas into the exhaust path, and thus to prevent the risk of combustion inside the exhaust path.

Further, preferably in the present apparatus invention, the threshold value of the cylinder number in the simultaneous misfire determination unit may be a minimum cylinder number at which a fuel gas density in an exhaust path reaches a combustible range after a certain number of cycles subsequent to determining the simultaneous misfire of more than one cylinder.

By setting the threshold value of cylinder number as described above, combustion of the non-combusted fuel gas is securely prevented inside the exhaust path during the simultaneous misfire state of more than one cylinder.

Herein, "a certain number of cycles" means the number of combustion cycles corresponding to the time delay after a simultaneous misfire is determined and before the fuel gas is actually shut. That is, it means the time after determining occurrence of a simultaneous misfire and before stopping the engine by transmitting a command to the gas supply controller (the fuel gas shut-off unit) to shut off each gas supply electromagnetic valve provided for each cylinder.

Further, as shown in FIG. 6, the minimum cylinder number at which the fuel gas density inside the exhaust path reaches the combustible range is set as a threshold value based on a relationship between the number of misfiring cylinders and the fuel gas density inside the exhaust path after the certain number of cycles. The relationship is obtained in advance by a test. In a case in which the fuel gas is of a carbon hydrate (methane, ethane, butane, propane, etc), there is a possibility of the density becoming around 5 to 15 percent, causing autoignition due to the exhaust temperature inside the exhaust path. Thus, the minimum cylinder number may be set such that the density does not exceed 5 percent.

Further, preferably in the present apparatus invention, in the case in which the engine is a V engine, the threshold value of the cylinder number in the simultaneous misfire determination unit may be a cylinder number of a single cylinder bank.

If only the gas supply electromagnetic valve of the single cylinder bank alone is in the non-operating state due to a trouble such as cut-off of the electrical wire or disconnection of the electrical connector for instance, the fuel gas density inside the exhaust path is likely to reach the combustible range. Even in such case, by setting the threshold value of cylinder number as described above, it is possible to prevent the risk of combustion of the fuel gas inside the exhaust path by stopping the supply of the fuel gas to perform an emergency stop.

Further, preferably in the present apparatus invention, the gas engine is configured to drive a generator, and a determination result determined by the simultaneous misfire determination unit is not used when the generator is operated in a predetermined operation range.

Depending on the operation state of the generator, more specifically, when it is in the non-load operation range, in the low-load operation range, or upon load rejection, more than one cylinder is temporary controlled to be in the simultaneous misfiring state. With the above configuration, it is possible to distinguish a misfire from the above misfire controlled in accordance with the operation state of the generator. As a result, the reliability of the control upon a simultaneous misfire of more than one cylinder according to the present invention is enhanced.

A control method is for a gas engine configured to mix a fuel gas and an air to be combusted in a combustion chamber of an engine. The control method comprises the steps of:
detecting a crank angle period of a single combustion cycle of the engine including a plurality of cylinders based on a crank angle detection value inputted from a crank angle detector; detecting a misfire in the combustion chamber based on an in-cylinder pressure detection value inputted from an in-cylinder pressure detector;

counting a number of cylinders where the misfire is detected in the single combustion cycle; determining a simultaneous misfire of more than one cylinder when the number counted is not less than a preset threshold value of a cylinder number; and shutting off a supply of a fuel gas to all of the cylinders upon determining the simultaneous misfire of more than one cylinder in the single combustion cycle.

According to the present invention, when the counted total number of cylinders misfired in the crank angle period corresponding to a single combustion cycle of the gas engine including a plurality of cylinders is not less than the threshold value of cylinder number, it is determined that a simultaneous misfire of more than one cylinder has occurred. Thus, it is possible to accurately determine a simultaneous misfire and to perform emergency stop by stopping the fuel gas supply to all of the cylinders.

As a result, it is possible to prevent the fuel gas density from rising in the exhaust path in a short period of time to reach the combustible range due to the intensive inflow of the non-combusted gas into the exhaust path, and thus to prevent the risk of combustion inside the exhaust path.

Further, preferably in the present method invention, the threshold value of the cylinder number in determining the simultaneous misfire may be a minimum cylinder number at which a fuel gas density in an exhaust path reaches a combustible range after a certain number of cycles subsequent to determining the simultaneous misfire of more than one cylinder.

By setting the threshold value of cylinder number as described above, combustion of the non-combusted fuel gas is securely prevented inside the exhaust path during the simultaneous misfire state of more than one cylinder.

Further, preferably in the present method invention, the misfire may be detected for each of the cylinders in the single combustion cycle upon every ignition in order of the ignition based on the in-cylinder pressure detection value inputted from the in-cylinder pressure detector, and determination of the simultaneous misfire of more than one cylinder may be performed in every single combustion cycle.

As described above, the simultaneous misfire of more than one cylinder is determined in every single combustion cycle and the emergency stop of the engine is performed based on the determination result. As a result, the simultaneous misfire is determined in a short period of time, making it possible to quickly prevent combustion of non-combusted fuel gas inside the exhaust path.

Advantageous Effects

According to the present apparatus invention and the present method invention, in a gas engine configured to mix a fuel gas and an air to be combusted in a combustion chamber of an engine, it is possible to accurately determine a simultaneous misfire of more than one cylinder in every single cycle, stop supply of a fuel gas, minimize inflow of the non-combusted fuel gas into the exhaust system, and thereby prevent combustion inside the exhaust path.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
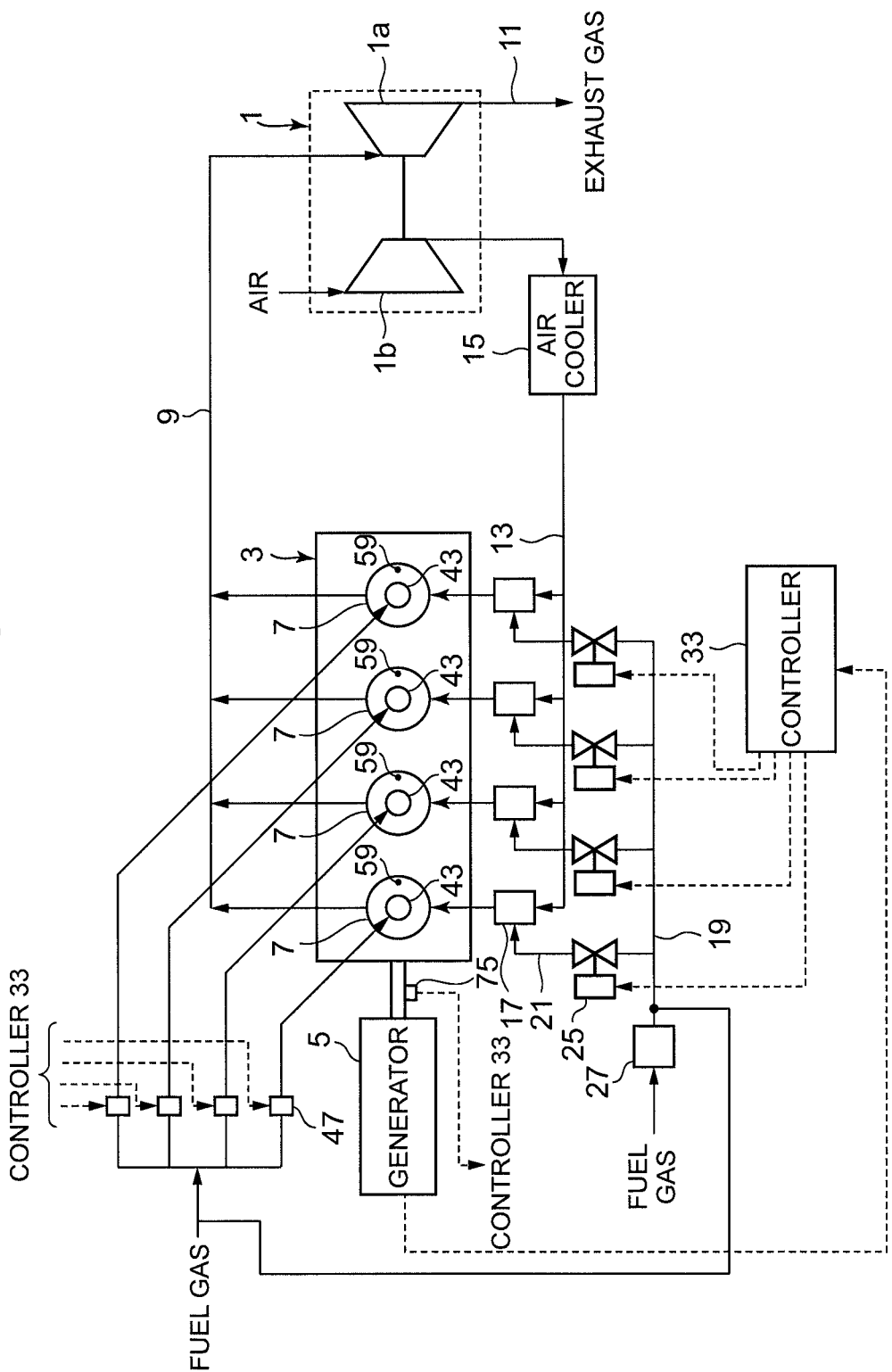
FIG. 1 is a diagram of the overall configuration of the controller for a gas engine according to the present invention.

The overall configuration of the controller for a gas engine according to the present invention will be described in reference to FIG. 1.

In the present embodiment, the controller described is for a gas engine 3 including an exhaust turbocharger (hereinafter, referred to as "turbocharger") 1. However, the controller is applicable to a gas engine not having a turbocharger 1. Also, while it is preferable that the driven object is a generator 5, the controller is also applicable in the case in which it is not a generator.

The gas engine (hereinafter, referred to as an "engine") 3 includes a four-cycle gas engine having four cylinders 7.

The turbocharger 1 includes a turbine 1a driven by the exhaust gas introduced from the exhaust ports of the cylinders 7 through the exhaust paths 9 and a compressor 1b for air compression provided coaxially to the turbine 1a. An exhaust outlet pipe 11 is connected to the exhaust outlet of the turbine 1a.

The air supply path 13, which connects each cylinder 7 to the supply air (the air) outlet of the compressor 1b of the turbocharger 1, is branched at its intermediate parts to be connected to each cylinder 7. Along the air supply path 13, an air cooler 15 is provided for cooling the supply air from the outlet of the compressor 1b.

A main-chamber gas supply electromagnetic valve 17 is provided for each cylinder 7 in the air supply path 13 at the side of the inlet of each cylinder 7, so that a fuel gas is supplied via a fuel supply main pipe 19 from the supply source (not shown). A fuel supply pipe 21 is connected to each of the main-chamber gas supply electromagnetic valves 17 from the fuel supply main pipe 19, branching for each cylinder 7. Fuel flow rate adjusting valves 25 are provided for the fuel supply pipes 21 for adjusting the amount of the fuel supply to the main combustion chambers 37 by the opening degrees.

In the fuel supply main pipe 19, a regulator (not shown) is disposed for adjusting the pressure of the fuel gas supplied to the cylinders 7 at a predetermined pressure. Also, a fuel-gas shut valve 27 is disposed in the fuel supply main pipe 19.

Calculation and control for the fuel gas flow rate, supply air flow rate or the like are performed in the controller 33.

The fuel flow rate adjusting valves 25 are configured to be adjusted in accordance with the output (rotation speed, load) of the generator 5.

Figure 2:
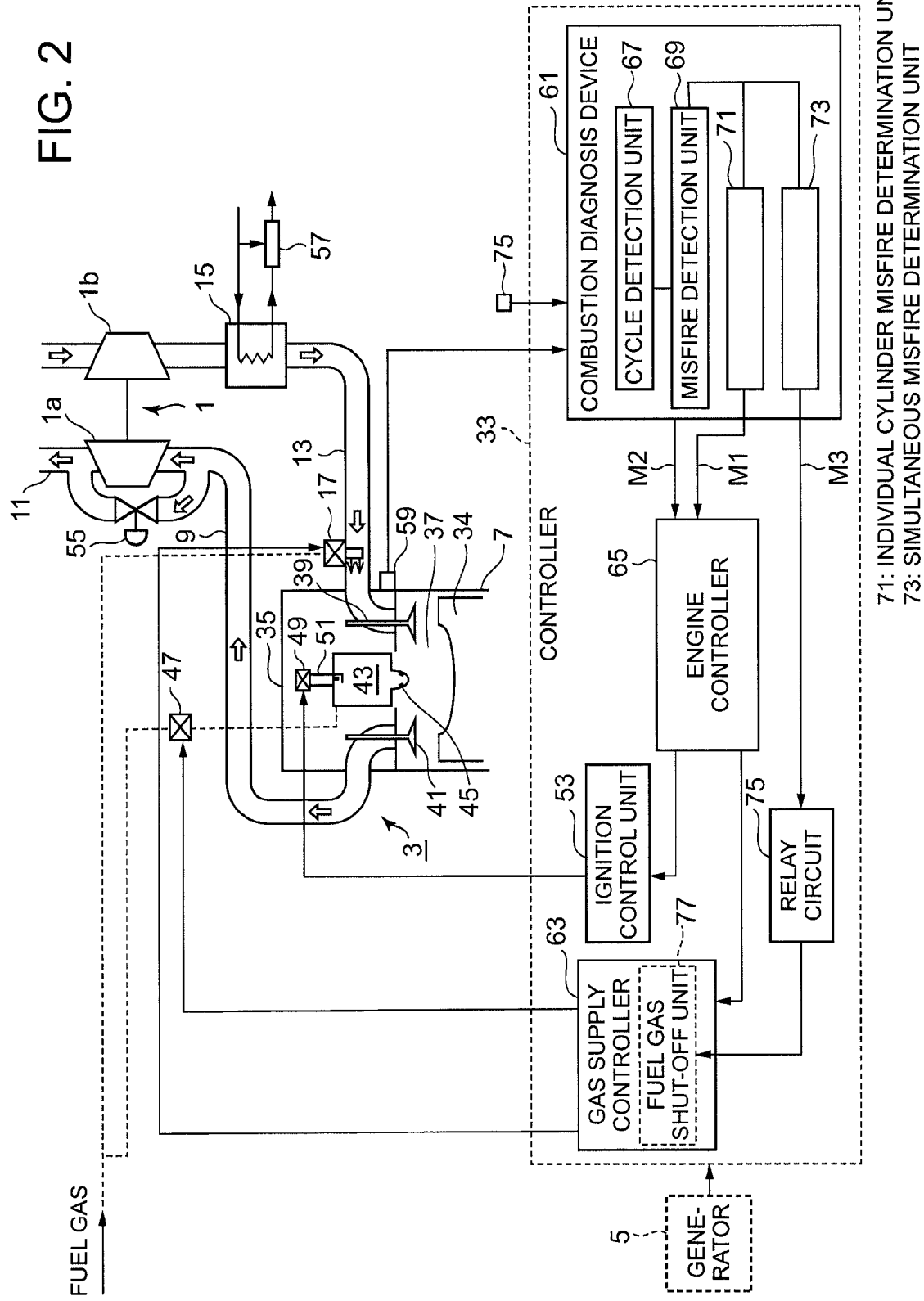
FIG. 2 is a detailed diagram of the overall configuration of the controller of the gas engine.

Further, as shown in FIG. 2, the main combustion chamber 37 is formed between the upper face of a piston 34 and the lower face of a cylinder head 35. The cylinder head 35 includes an air supply valve 39 and an exhaust valve 41 for taking in and discharging a mixed air into and from the main combustion chamber 37.

The cylinder head 35 also includes a precombustion chamber 43 as an ignition device. An injection opening 45 of the precombustion chamber 43 is arranged to be positioned in the central part of the main combustion chamber 37. The fuel gas is supplied to the precombustion chamber 43 through a precombustion-chamber gas supply electromagnetic valve 47. Also, a spark plug 51, to which an ignition coil 49 is mounted to ignite the fuel gas supplied into the precombustion chamber 43, is attached inside the precombustion chamber.

Once the fuel gas supplied into the precombustion chamber 43 is sparked by an ignition signal from an ignition control unit 53 to the spark plug 51, the fuel gas inside the precombustion chamber 43 is ignited, the ignition flame being injected into the main combustion chamber 37 from the ignition opening 45 of the precombustion chamber 43, and thereby combusting the mixed gas of the air and fuel gas flowed into the main combustion chamber 37 from the air supply valve 39. As a result, it is possible to securely ignite and combust lean mixed gas.

As shown in FIG. 2, an exhaust bypass valve 55 for causing the exhaust gas to bypass so as to adjust the supercharging amount is provided for the turbine 1a of the turbocharger 1. Further, a supply air temperature adjusting valve 57 for causing a cooling water to bypass so as to adjust its cooling capacity is provided for the air cooler 15.

While the present embodiment illustrates a gas engine of a spark ignition type using a spark plug 51 as an ignition device, a precombustion-chamber pilot ignition type may be employed, where a fuel injection valve is provided for a precombustion chamber 43, injecting a liquid fuel such as the gas oil into the air flow formed inside the precombustion chamber from the fuel injection valve so as to ignite and combust the liquid fuel, the ignition flame being injected into the mixed gas of the fuel gas and the air introduced into the main combustion chamber 37 from the injection opening 45 so as to combust the mixed air.

In the engine 3 having the above configuration, the exhaust gas from the engine 3 passes through the exhaust path 9 and drives the turbine 1a of the turbocharger 1, and then is discharged to an exhaust gas purifying device or the like from the exhaust outlet pipe 11. The supply air (the air), whose pressure is increased by the compressor 1b driven coaxially with the turbine 1a, is cooled to lower its temperature in the air cooler 15, flowed through the air supply path 13, and introduced into the main combustion chamber 37 through the main-chamber gas supply electromagnetic valve 17 of each cylinder 7. The fuel from the fuel supply main pipe 19 is branched into each fuel supply pipe 21 of each cylinder 7, and then introduced into the main-chamber gas supply electromagnetic valves 17. Next, the supply air and the fuel gas are mixed in the main-chamber gas supply electromagnetic valve 17 to become a mixed gas, which is then supplied to the main combustion chamber 37 of each cylinder 7 to be used in combustion.

On the other hand, as described above, the spark plug 51 is sparked by a signal of the predetermined ignition timing from the ignition control unit 53, igniting the fuel gas supplied to the precombustion chamber 43 through the precombustion-chamber gas supply electromagnetic valve 47. The ignited flame is injected into the main combustion chamber 37 from the injection opening 45 of the precombustion chamber 43. As a result, the mixed air flowed into the main combustion chamber 37 through the air supply valve 39 is combusted.

Next, the controller 33 will be described in reference to FIGS. 1 and 2.

As shown in FIG. 2, the controller 33 includes a combustion diagnosis device 61 for diagnosing the combustion state inside the main combustion chamber 37 based on a signal from an in-cylinder pressure detector 59 for detecting the in-cylinder pressure inside the main combustion chamber 37 of each cylinder 7, a gas supply controller 63 for controlling supply and shut-off as well as supply amount of the fuel gas, an ignition control unit 53 for controlling ignition inside the precombustion chamber 43, and an engine controller 65 for outputting an operation command for each cylinder 7 in accordance with a combustion diagnosis result in each cylinder 7, i.e., a diagnosis result signal M1 of a misfire of each cylinder 7 or a diagnosis result signal M2 of abnormal combustion other than a misfire such as knocking.

The combustion diagnosis device 61 mainly includes a cycle detection unit 67, a misfire detection unit 69, an individual cylinder misfire determination unit 71, and a simultaneous misfire determination unit 73.

The cycle detection unit 67 detects a pulse signal representing a crank angle period of a single combustion cycle of the engine 3 including a plurality of cylinders based on a crank angle detection signal inputted from a crank angle detector 75 disposed on a crank shaft or a cam shaft. In the case of a four-cycle engine, one single combustion cycle is detected as a signal every two rotations (720 degrees) of the crank shaft (see the pulse signal of the single combustion cycle in FIG. 5).

The misfire detection unit 69 detects a detection value P of the in-cylinder pressure and a reference pressure $P_b$ previous to the onset of compression including the supply air pressure, whose fluctuation due to external conditions such as the atmospheric state is small during operation of the engine, based on an in-cylinder pressure detection value inputted from an in-cylinder pressure detector 59 and a crank angle detection value inputted from a crank angle detector 75. Then, using the reference pressure $P_b$ and the detection value P of the in-cylinder pressure, an in-cylinder pressure ratio $\Delta P/\Delta P_0$ is calculated based on the pressure difference $\Delta P$ ($\Delta P = P - P_b$) between the reference pressure $P_b$ and the detection value P of the in-cylinder pressure. Finally, a misfire is detected by determining the misfire state using the in-cylinder pressure ratio $\Delta P/\Delta P_0$.

The pressure difference $\Delta P_0$ is a pressure difference $\Delta P_0$ ($\Delta P_0 = P_0 - P_b$) between the in-cylinder pressure $P_o$ at a particular crank angle of the compression stroke and the reference pressure $P_b$.

Specifically, using the pressure difference $\Delta P_p$ ($\Delta P_p = P_p - P_b$) between the pressure $P_p$ of a particular timing and the reference pressure $P_b$, it is determined that there is a misfire in the main combustion chamber 37 when the pressure ratio $\Delta P_p/\Delta P_0$ has become not greater than the minimum value of the pressure ratio for a misfire set in advance by checking in a test or the like, i.e., the tolerance minimum pressure ratio $P_n$ ($\Delta P_p/\Delta P_0 \leq P_n$). This misfire determination for multicylinders is performed on each cylinder 7 in order of ignition based on the in-cylinder pressure detection value.

The pressure ratio $\Delta P_p/\Delta P_0$ is used as an example, and the determination can be performed merely using the in-cylinder pressure difference $\Delta P_p$ ($\Delta P_p = P_p - P_b$).

The individual cylinder misfire determination unit 71 determines that a misfire has occurred in one particular cylinder 7 when the results of misfire determination by the misfire detection unit 69 come out in series for the same particular cylinder 7 to reach a predetermined number of times, preventing a determination error, and then outputs a diagnosis result signal M1 reporting a misfire of the particular cylinder 7 to the engine controller 65. Next, a control command for stopping supply of the fuel gas or the like is outputted to the gas supply controller 63 individually for each cylinder 7.

The simultaneous misfire determination unit 73 counts the number of cylinders where a misfire is detected by the misfire detection unit 69 in the period of the single combustion cycle detected by the cycle detection unit 67. When the number counted is not less than the threshold value of cylinder number set in advance, the simultaneous misfire determination unit 73 determines that more than one cylinder has caused a simultaneous misfire and outputs an emergency stop signal M3 to a relay circuit 75.

Figure 4:
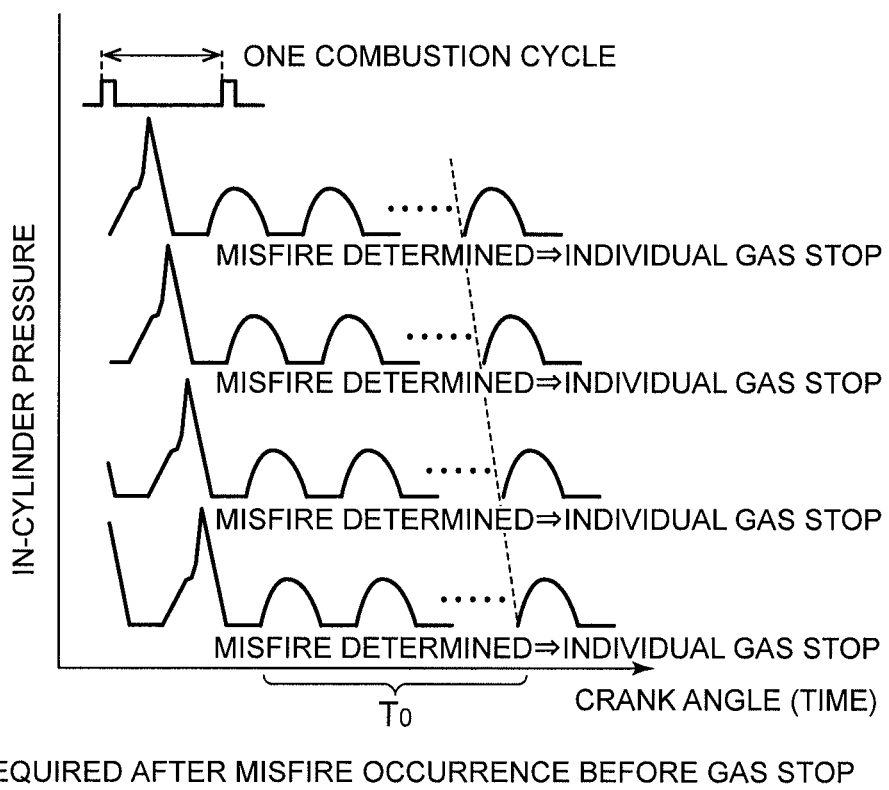
FIG. 4 is a diagram illustrating the combustion stroke alone of the in-cylinder pressure waveform, where four cylinders are shown as an example, for explaining the individual misfire determination for each cylinder.

FIG. 4 is an image of the determination by the individual cylinder misfire determination unit 71, where only the combustion stroke of the in-cylinder pressure waveform is shown. It takes time $T_o$ before the fuel gas is stopped because it is necessary to detect a misfire in series after occurrence of a misfire in a particular cylinder before determination of the misfire in the particular cylinder is completed.

Figure 5:
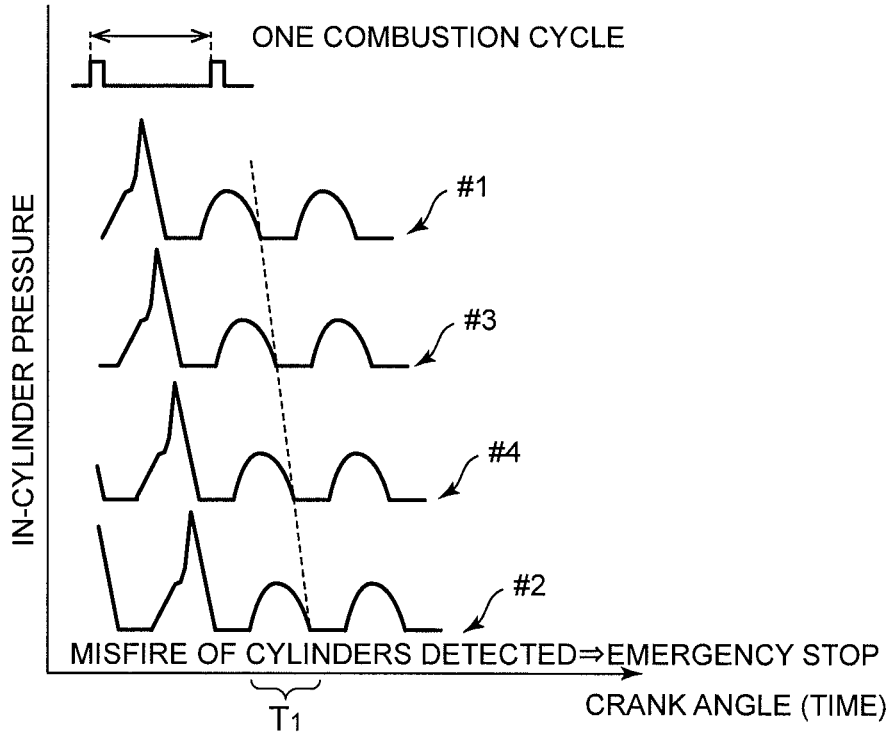
FIG. 5 is a diagram of the simultaneous misfire determination according to the present invention, corresponding to FIG. 4.

FIG. 5 is an image of the determination by the simultaneous misfire determination unit 73, where only the combustion stroke of the in-cylinder pressure waveform is shown. The number of misfiring cylinders in a period of the crank angle corresponding to a single combustion cycle is counted, and a simultaneous misfire is determined when the number counted has become not less than the threshold value of cylinder number set in advance.

When more than one cylinder is determined to be simultaneously misfiring, all cylinders are shut off to stop the engine. Thus, it takes time $T_1$ before the fuel gas is stopped. As a result, it is possible to arrive at the state in which the engine is stopped in a short period of time compared to the case in which the individual cylinder misfire determination unit 71 in FIG. 4 is used.

The emergency stop signal M3 from the simultaneous misfire determination unit 73 is outputted to the relay circuit 75. Thus, unlike the individual cylinder misfire determination unit 71, the command signal is outputted to the gas supply controller 63 without being outputted to the engine controller 65, and then outputted to a fuel gas shut-off unit 77. As a result, the fuel gas is shut off quickly and securely.

The threshold value of cylinder number set in advance for the simultaneous misfire determination unit 73 is set to the minimum cylinder number at which the fuel gas density inside the exhaust path 9 reaches the combustible range after a certain number of cycles (after a certain period of time) subsequent to the determination of a simultaneous misfire of more than one cylinder.

When there is a trouble of the ignition device such as malfunction of a spark plug 51 or a precombustion-chamber gas supply electromagnetic valve for supplying fuel gas to the precombustion chamber 43, the mixed gas of the fuel gas and the air introduced into the main combustion chamber 37 by opening the air supply valve 39 is not combusted and flowed into the exhaust path 9 as a non-combusted gas. As a result, when more than one cylinder simultaneously misfires, the fuel gas density rises in the exhaust path 9 in a short period of time and thus is likely to reach the combustible range, increasing the risk of combustion inside the exhaust path 9. There is a possibility of damage to the exhaust path 9 or harm to its surroundings if the fuel gas is combusted inside the exhaust path 9.

It is possible to prevent combustion of the non-combusted fuel gas inside the exhaust path 9 in the simultaneous misfire state by setting the threshold value of cylinder number for the simultaneous misfire determination unit 73 to the minimum cylinder number at which the fuel gas density inside the exhaust path 9 reaches the combustible range after a certain number of cycles (after a certain period of time) subsequent to the determination of a simultaneous misfire of more than one cylinder as described above.

Herein, "a certain number of cycles" means the number of combustion cycles corresponding to the time delay after a simultaneous misfire is determined and before the fuel gas is actually stopped. That is, it means the time after a simultaneous misfire is determined and before the engine is stopped by transmitting a command to the fuel gas shut-off unit 77 of the gas supply controller 63 to shut off each main-chamber gas supply electromagnetic valve 17 provided for each cylinder 7.

Figure 6:
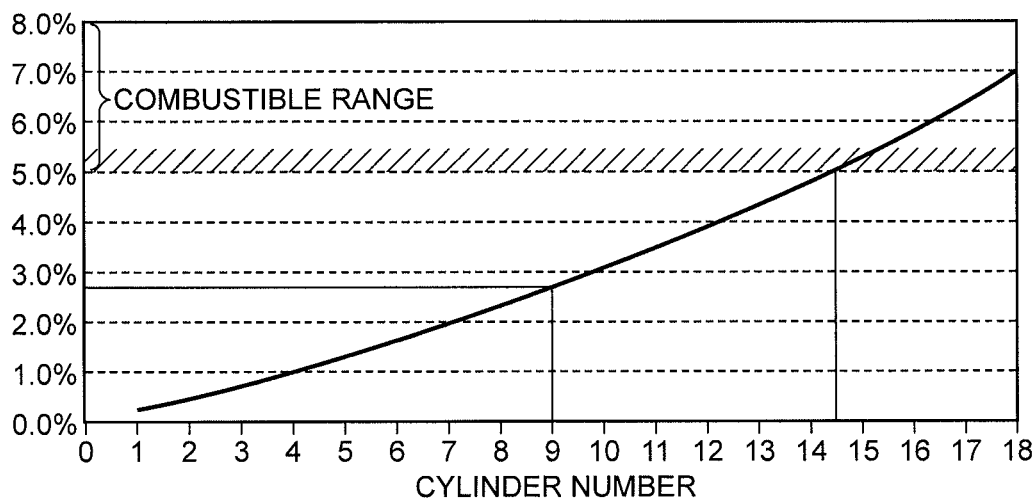
FIG. 6 is a characteristic diagram showing the fuel gas density inside the exhaust path with respect to the number of misfiring cylinders.

The minimum cylinder number at which the fuel gas density inside the exhaust path 9 reaches the combustible range is set as a threshold value based on a relationship between the number of misfiring cylinders and the fuel gas density inside the exhaust path 9 after the certain number of cycles (the certain period of time), the relationship being obtained in advance by a test, as shown in FIG. 6. In a case in which the fuel gas is of a carbon hydrate (methane, ethane, butane, propane, etc), there is a possibility of autoignition due to the exhaust temperature inside the exhaust path when the density is around 5 to 15 percent. Thus, the minimum cylinder number is set such that the density does not exceed 5 percent.

In FIG. 6, shown is a case in which a gas engine is a V engine with 18 cylinders. The minimum cylinder number at which the density becomes not less than 5 percent is set at 14.

The minimum cylinder number may also be set at 9, which is the number of cylinders in a single cylinder bank, which is another example setting of the threshold cylinder number.

With the threshold value of cylinder number set to the cylinder number in a single cylinder bank as described above, it is possible to prevent the risk of combustion of the fuel gas inside the exhaust path 9 by stopping supply of the fuel gas to perform an emergency stop even when only the precombustion-chamber gas supply electromagnetic valve 47 or the ignition plug 51 of the single cylinder bank alone is in the non-operating state due to a trouble such as cut-off of the electrical wire or disconnection of the electrical connector for instance.

When the number of cylinders in the single cylinder bank is larger than the minimum cylinder number set based on the fuel gas density inside the exhaust path of FIG. 6, the threshold value of cylinder number may be used in order to be on the safe side.

Figure 3:
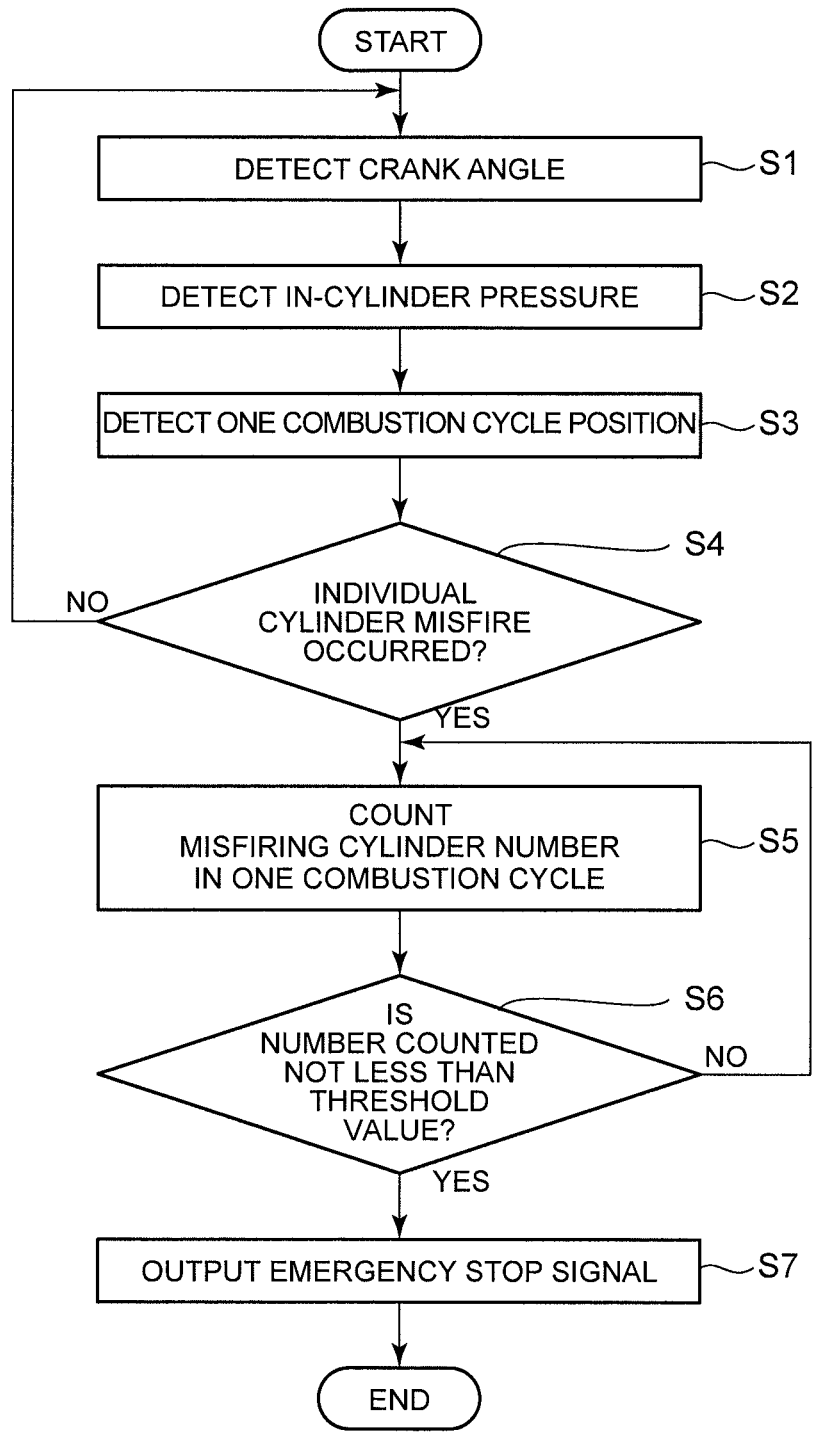
FIG. 3 is a flow chart of the controller.

Next, the control process of the controller 33 will be described in reference to the flow chart of FIG. 3.

First, in steps S1 and S2, a crank angle is detected by the crank angle detector 75 and an in-cylinder pressure inside the main combustion chamber 37 of each cylinder 7 is detected by the in-cylinder pressure detector 59. In step S3, a pulse signal of the single combustion cycle is detected. That is, such a pulse single is detected that represents the crank angle period corresponding to a single combustion cycle of the engine 3 including a plurality of cylinders (two rotations/720 degrees) based on the crank angle detection signal inputted from the crank angle detector 75 disposed on a crank shaft or a cam shaft.

In step S4, using the pressure difference $\Delta P_p$ ($\Delta P_p = P_p - P_b$) between the pressure $P_p$ of a particular timing and the reference pressure $P_b$, a misfire in the main combustion chamber 37 is detected by determining whether the pressure ratio $\Delta P_p/\Delta P_0$ has become not greater than the minimum value of the pressure ratio to indicate a misfire set in advance by checking in a test or the like, i.e., the tolerance minimum pressure ratio $P_n$ ($\Delta P_p/\Delta P_0 \leq P_n$). This misfire determination for the multicylinders is performed on each cylinder 7 in order of ignition based on the in-cylinder pressure detection value.

If a misfire is not detected, the process returns to step S1. If a misfire is detected, the process advances to step S5 to count the number of misfiring cylinders in a single combustion cycle. In step S6, it is determined whether the counted number is not less than the threshold value of cylinder number. If NO, the procedure returns to step S5. If YES, it is determined that more than one cylinder is simultaneously misfiring. Subsequently, the emergency stop signal M3 is outputted to the relay circuit 75 in step S7. A shut-off signal is outputted to the fuel gas shut-off unit 77 of the gas supply controller 63 from the relay circuit 75, and thereby the main-chamber gas supply electromagnetic valves 17 of all cylinders are shut off.

Figure 7:
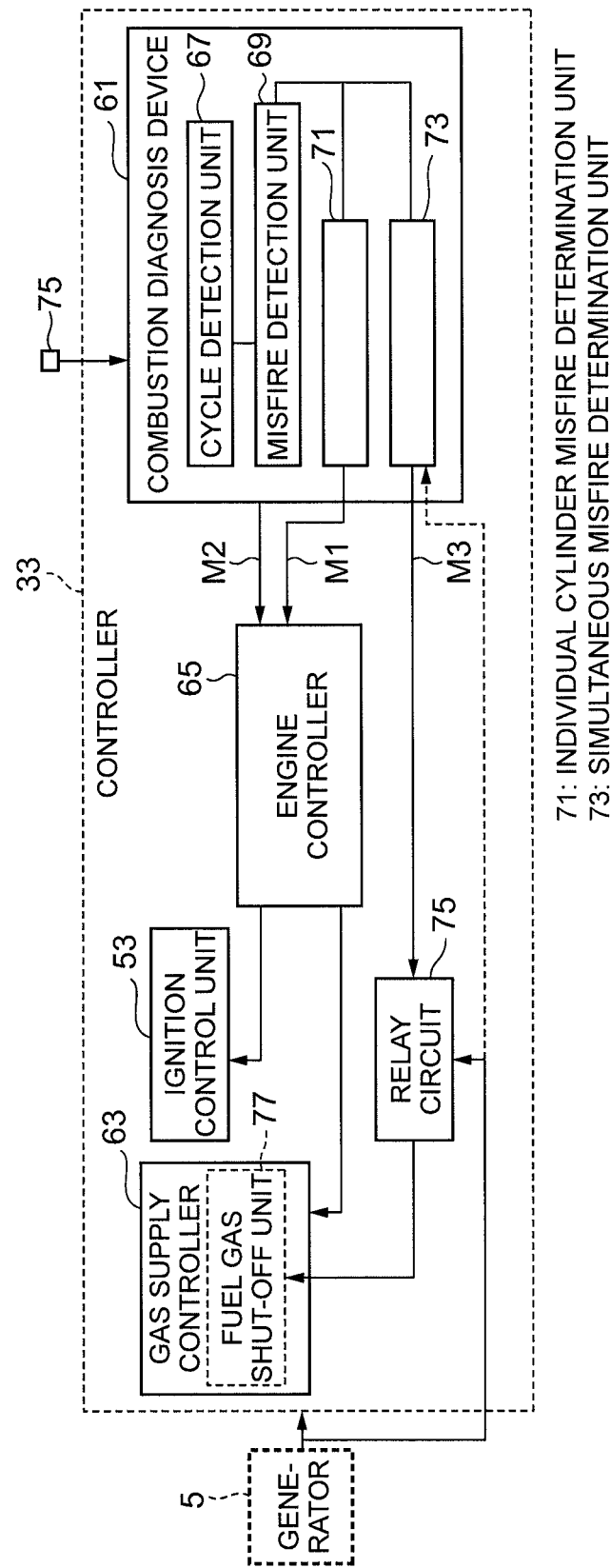
FIG. 7 is a configuration diagram of another embodiment of the controller.

Depending on the operation state of the generator 5, more specifically, when the generator 5 is in the non-load operation range or the low-load operation range, or in load rejection, more than one cylinder 7 is controlled to be temporary in the simultaneous misfiring state. Thus, it is necessary to distinguish a misfire from the misfire controlled in accordance with the operation state of the generator 5. As shown in FIG. 7, the output from the generator 5 may be inputted to the relay circuit 75 or the simultaneous misfire determination unit 73 to limit the output from the simultaneous misfire determination unit 73 or the determination itself of the simultaneous misfire determination unit 73, so that the fuel gas shut-off unit 77 of the gas supply controller 63 is not operated in the case of the misfire controlled in accordance with the operation state of the generator 5.

With such control, the reliability of the fuel gas shut-off control for preventing combustion of the fuel gas inside the exhaust gas, which is an object of the present invention, is improved.

As described above, according to the present embodiment, it is possible to accurately determine a simultaneous misfire and to stop supplying the fuel gas to all the cylinders to perform an emergency stop by determining occurrence of a simultaneous misfire when a misfire is determined in more cylinders than the threshold value of cylinder number in the crank angle period corresponding to a single combustion cycle of the engine 3 including a plurality of cylinders.

As a result, it is possible to prevent the fuel gas density from rising in the exhaust path in a short period of time to reach the combustible range due to intensive inflow of the non-combusted fuel gas into the exhaust path 9, and thus to prevent the risk of combustion inside the exhaust path 9.

INDUSTRIAL APPLICABILITY

According to the present invention, in a gas engine configured to mix a fuel gas and an air to be combusted in a combustion chamber of an engine, it is possible to accurately determine a simultaneous misfire of more than one cylinder in a single combustion cycle, stop supply of a fuel gas, minimize inflow of the non-combusted fuel gas into the exhaust system, and thereby prevent combustion inside the exhaust path. Thus, the present invention is suitable for use in a gas engine for a generator and other gas engines.

The invention claimed is:

1. A controller for a gas engine having a plurality of combustion chambers configured to mix a fuel gas and an air and to be combusted in,
   wherein the gas engine includes:
   in-cylinder pressure detectors configured to detect an in-cylinder pressure inside the plurality of combustion chambers respectively; and
   a crank angle detector configured to detect a crank angle of the gas engine including a plurality of cylinders, and
   wherein the controller comprises:
   a cycle detection unit configured to detect a crank angle period of a single combustion cycle of the gas engine based on the crank angle inputted from the crank angle detector;
   a misfire detection unit configured to detect a misfire in the plurality of combustion chambers based on the in-cylinder pressure inputted from the plurality of in-cylinder pressure detectors;
   a simultaneous misfire determination unit configured to determine a simultaneous misfire of more than one cylinder when a total number of cylinders where the misfire is detected in the single combustion cycle by the misfire detection unit is not less than a preset threshold value of a cylinder number; and
   a fuel gas shut-off unit configured to shut off a supply of a fuel gas to all of the cylinders when the simultaneous misfire of more than one cylinder in the single combustion cycle is determined by the simultaneous misfire determination unit,
   wherein the preset threshold value of the cylinder number is set based on a relationship between a number of misfiring cylinders and a fuel gas density inside an exhaust path after a certain number of cycles subsequent to determining the simultaneous misfire of more than one cylinder and is a minimum cylinder number at which the fuel gas density in the exhaust path reaches a combustible range on the relationship.

2. The controller for a gas engine according to claim 1, wherein the gas engine comprises a V engine, and
   wherein the preset threshold value of the cylinder number is a cylinder number of a single cylinder bank.

3. The controller for a gas engine according to claim 1, wherein the gas engine is configured to drive a generator, and
   wherein a determination result determined by the simultaneous misfire determination unit is not used when the generator is operated in a predetermined operation range.

4. A control method for a gas engine having a plurality of combustion chambers configured to mix a fuel gas and an air to be combusted in, comprising the steps of:
   detecting a crank angle period of a single combustion cycle of the gas engine including a plurality of cylinders based on a crank angle detection value inputted from a crank angle detector;
   detecting a misfire in the plurality of combustion chambers based on an in-cylinder pressure detection value inputted from a plurality of in-cylinder pressure detectors respectively; counting a number of cylinders where the misfire is detected in the single combustion cycle;

determining a simultaneous misfire of more than one cylinder when the number counted is not less than a preset threshold value of a cylinder number; and shutting off a supply of a fuel gas to all of the cylinders upon determining the simultaneous misfire of more than one cylinder in the single combustion cycle, wherein the preset threshold value of the cylinder number is set based on a relationship between a number of misfiring cylinders and a fuel gas density inside an exhaust path after a certain number of cycles subsequent to determining the simultaneous misfire of more than one cylinder and is a minimum cylinder number at which a fuel gas density in an exhaust path reaches a combustible range on the relationship.

5. The control method for a gas engine according to claim 4, wherein, the misfire is detected for each of the plurality of cylinders in the single combustion cycle upon every ignition in order of the ignition based on the in-cylinder pressure detection value inputted from the plurality of in-cylinder pressure detectors, and wherein determination of the simultaneous misfire of more than one cylinder is performed in every single combustion cycle.

* * * * *